United States Patent
Byron

[11] Patent Number: 5,956,442
[45] Date of Patent: Sep. 21, 1999

[54] BRAGG REFLECTION GRATINGS IN OPTICAL FIBRES

[75] Inventor: Kevin Christopher Byron, Bishop's Stortford, United Kingdom

[73] Assignee: Northern Telecom Limited, Montreal, Canada

[21] Appl. No.: 08/566,499

[22] Filed: Dec. 4, 1995

[51] Int. Cl.[6] ................................................... G02B 6/34
[52] U.S. Cl. ............................................................... 385/37
[58] Field of Search ................................. 385/4, 10, 11, 385/37, 123, 129, 130, 147; 359/3, 24, 569, 578, 900

[56] References Cited

U.S. PATENT DOCUMENTS

| | | | |
|---|---|---|---|
| 5,309,260 | 5/1994 | Mizrahi et al. | 359/569 X |
| 5,363,239 | 11/1994 | Mizrahi et al. | 385/10 X |
| 5,367,588 | 11/1994 | Hill et al. | 385/14 X |
| 5,420,948 | 5/1995 | Byron | 385/37 |
| 5,428,695 | 6/1995 | Ohta | 385/37 X |

FOREIGN PATENT DOCUMENTS 2 289 771  11/1995  United Kingdom.

OTHER PUBLICATIONS

Dix, "High accuracy electron–beam grating lithography for optical and optoelectronic devices", J. Vac. Sci. Technol. B., vol. 10, No. 6, pp. 2667–2670, Nov./Dec. 1992.

Martin, "Novel writing technique of long in–fiber Bragg gratings and investigation of the linearly chirped component", CL10 conference, May 11, 1994.

Primary Examiner—Akm E. Ullah
Attorney, Agent, or Firm—Lee, Mann, Smith, McWilliams, Sweeney Ohlson

[57] ABSTRACT

Exposure to UV light of a photosensitive optical fiber through a uniform pitch phase grating is employed to write a chirped Bragg reflection grating in that fiber by imparting tensile strain to the fiber while sections of the Bragg reflection grating are sequentially written, and by altering the magnitude of that strain during the writing process.

6 Claims, 3 Drawing Sheets

BRAGG REFLECTION GRATINGS IN OPTICAL FIBRES

BACKGROUND OF THE INVENTION

This invention relates to the creation of Bragg reflection gratings in photosensitive optical fibres. It is known that such a grating can be created by illuminating the photosensitive optical fiber from the side, writing the lines simultaneously with an interferometrically generated fringe pattern of light. Such a fringe pattern can be generated using two-beam interferometry, or as a localized fringe pattern generated in the vicinity of a diffraction grating, typically a phase grating, through which the light is caused to pass.

Typically relatively high intensity UV light is employed to write such Bragg gratings and, although relatively short gratings can be written in fiber using two-beam interferometry with the requisite uniformity, for applications requiring longer gratings extending over at least a few centimeters, the use of a phase grating mask to generate the requisite fringe pattern is generally preferred because the light does not have simultaneously to illuminate the whole length of fiber to be written, but can be traversed in a small, and hence higher intensity, beam.

A Bragg grating of uniform pitch can be generated using a phase grating also of uniform pitch. Similarly a chirped Bragg grating a grating, the optical pitch of whose grating elements varies along its length, can be generated using a phase grating of non-uniform pitch. (The optical pitch is the product of the physical pitch with the effective refractive index of the fiber. The effective refractive index is generally, but not necessarily, uniform along the length of the fiber: it could be non-uniform, for instance, if the fiber were tapered.)

The construction of a chirped Bragg grating in a tapered fiber using a uniform pitch two-beam interference generated fringe pattern is described in the specification of GB Patent Application No 9316738.5

A chirped Bragg grating can also be generated using a phase grating of uniform pitch by the method described by J Martin et al in a paper entitled 'Novel writing technique in long in-fiber Bragg gratings and investigation of the linearly chirped component' CLIO conference paper Monday, May 11, 1994, this method involving maintaining a temperature gradient along the fiber while the grating is written into it.

SUMMARY OF THE INVENTION

The present invention is directed to an alternative method of obtaining chirp in a fiber Bragg grating written using a diffraction grating, typically a uniform pitch diffraction grating. This method is not restricted to the generation of linear chirp.

According to the present invention there is provided a method of writing a chirped Bragg reflection grating in a photosensitive optical fiber, which grating is created by traversing a beam of electromagnetic radiation along the fiber axis, which beam is incident upon the fiber through a diffraction grating located adjacent the fiber and oriented to have diffracting elements extending at an angle to the fiber axis, wherein the fiber is longitudinally tension by an amount that is varied during the writing therein of the grating.

BRIEF DESCRIPTION OF THE DRAWINGS

There follows a description of the writing, by a method embodying the invention in a preferred form, of a chirped Bragg reflection grating in an optical fiber waveguide. The description refers to the accompanying drawings, in which.

DETAILED DESCRIPTION OF PREFERRED EMBODIMENT

Figure 1:
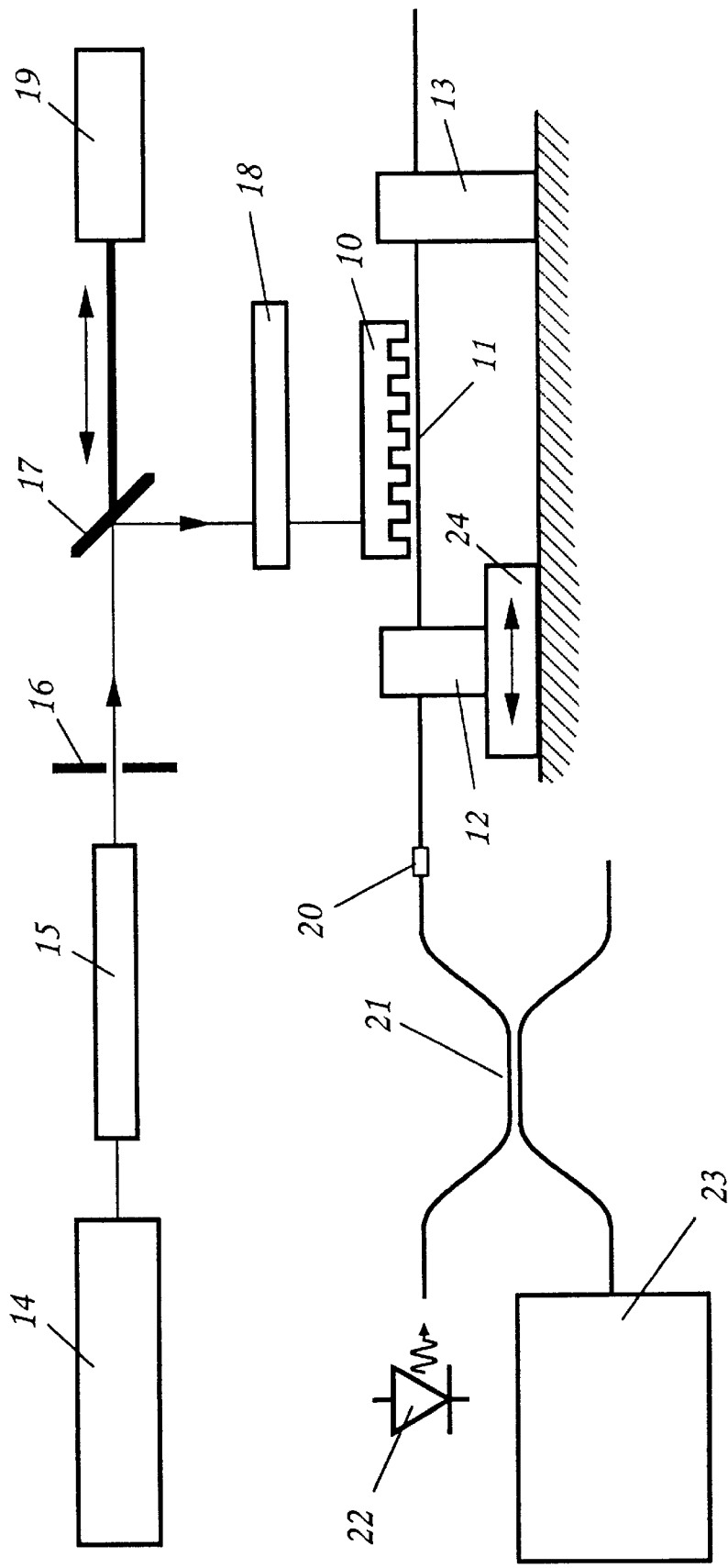
FIG. 1 is a schematic diagram of the apparatus employed to write the grating.

The writing of the Bragg reflection grating requires the use of a diffraction grating. In this instance the diffraction grating has the form of a phase grating (phase contrast diffraction grating). This grating was created in a plasma enhanced chemical vapour deposited silica layer deposited upon a silica substrate. For this purpose the deposited silica layer was coated with a layer of chromium that was itself created with a layer of electron beam lithography resist. A grating 50mm in length was created in the chromium layer by electron beam lithography. With the particular equipment employed it was not found possible to scan the electron beam over the full 50 mm without incurring significant distortions or discontinuities, to the linear scan, and so a mechanical step and repeat procedure was employed to create the full length of grating in sections. Such mechanical stepping can itself introduce large discontinuities, but precautions were taken to reduce this to minimal levels by careful attention to the calibration of the electron beam scan field and correction of scan distortions after the manner set out by C Dix et al., "High accuracy electron-beam grating lithography for optical and optoelectronic devices" J. Vac. Sci. Technol. B, 1992, 10(6),pp 2662.

The electron beam lithography resist was patterned and developed to provide an etch mask for the underlying chromium layer. Then the chrome layer was etched to provide a mask for the silica layer that underlied it, and finally the chromium mask layer was etched away to leave the required phase grating, which is depicted at 10 in FIG. 1.

For the writing of a chirped Bragg reflection grating in a length of single mode optical fiber 11, the fiber is held tensioned between two towers 12, 13 so as to be almost in contact with the phase grating 10, which is oriented so that its grating lines extending transversely of the fiber axis, preferably at right angles to that axis. An argon ion laser 14 providing a frequency doubled ultraviolet light output has this output directed on to the phase grating 10 via a telescope 15, and aperture 16, a mirror 17, and a cylindrical lens 18. The mirror 15 is attached to a stepper drive 19 by means of which the mirror can be translated in a controlled manner in the axial direction of the fiber 11 so as to track the light beam across the phase grating 10 in the axial direction of the fiber 11. For monitoring purposes, the fiber 11 is spliced at 20 to a 3 dB fiber coupler 21 so that light from an ELED 22 can be launched into the fiber and the reflection monitored on a spectrum analyzer 23. The phase grating 10 has a uniform pitch and the fiber 11 has a uniform cross section. Therefore, if the temperature of the fiber, and the tension maintained within it, were both maintained constant during the tracking of the light beam across the phase grating 10 to write the Bragg reflection grating in the fiber, the resulting Bragg reflection grating would be a uniform pitch grating rather than a chirped one. In this instance a chirped grating is required, and this is obtained by varying the tension in the fiber during the tracking of the light. For this purpose tower 12 is mounted on a motorized translation stage 24. The varying of the tension and the tracking of the light may be performed on either a continuous basis or a stepped basis.

Figure 2:
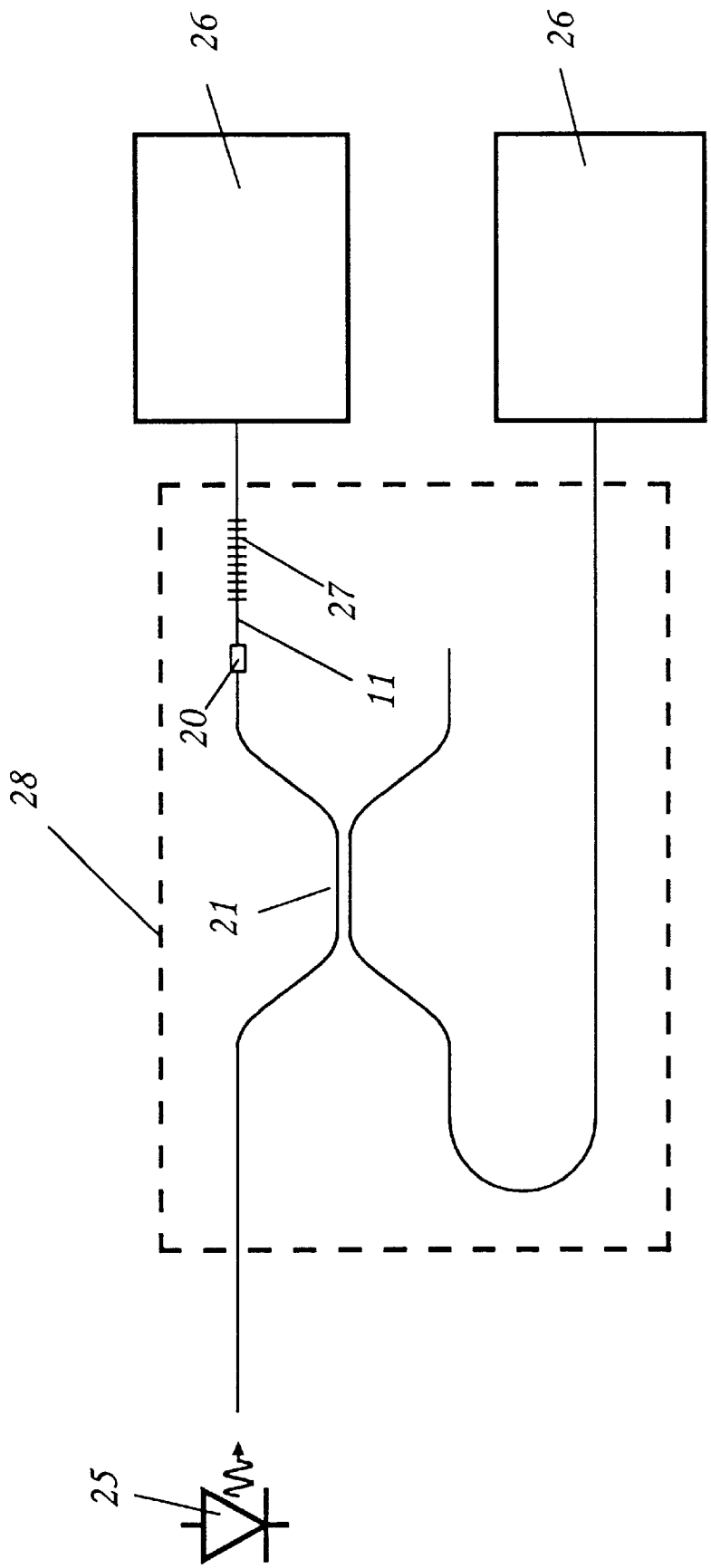
FIG. 2 is a schematic diagram of apparatus employed to analyze the spectral properties of the grating so formed.

The monitoring arrangement provided by the ELED 22 and spectrum analyzer 23 of FIG. 1 is suitable for monitoring the writing of the Bragg reflector, but does not have the spectral resolution to measure the bandwidth of that reflector. This can be measured, as depicted in FIG. 2, by replacing the ELED 22 with a tuneable diode laser source 25 which is scanned under computer control in 0.001 nm (125 MHz) spectral steps across the bandwidth of the Bragg reflector while the reflected and transmitted powers are measured on two optical power meters 26. While bandwidth measurements are made, the 3 dB fiber coupler 21 and the fiber 11 (with its Bragg grating represented by lines 27) are preferably kept in a temperature controlled housing 28 in order to minimise errors in the results attributable to the effects of temperature upon the Bragg grating.

Figure 3:
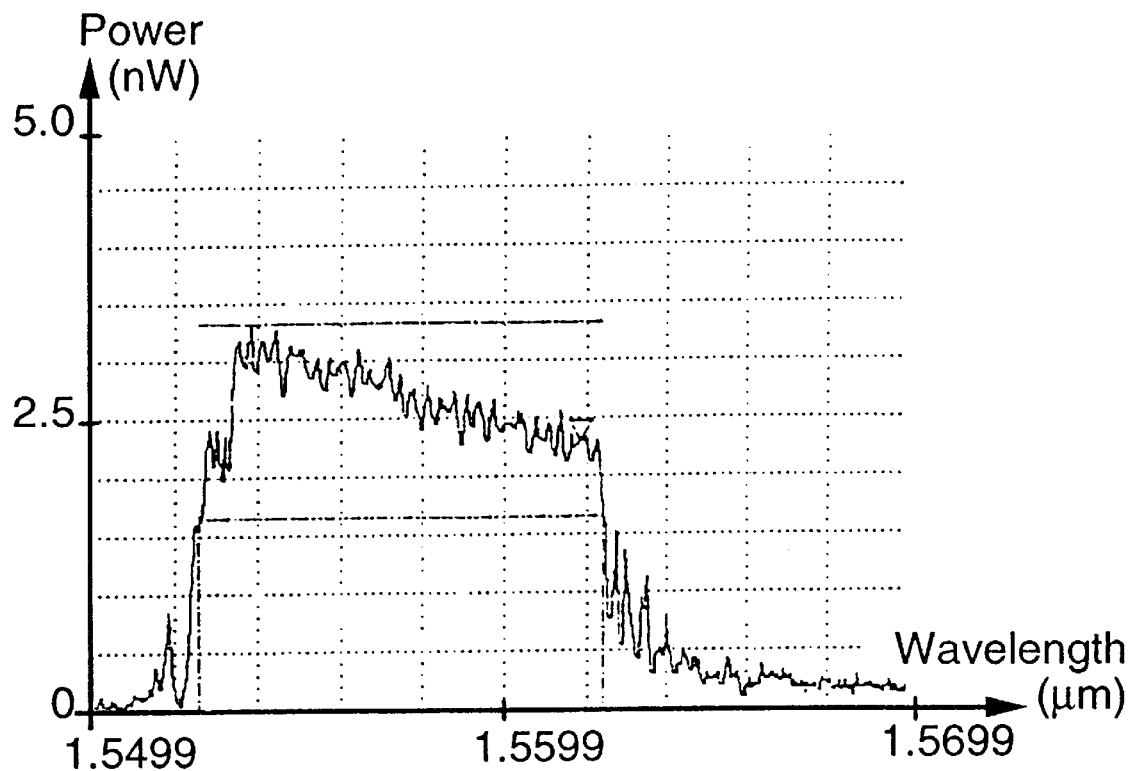
FIGS. 3 and 4 are plots of the spectral properties of the grating, respectively in reflection and in transmission.
Figure 4:
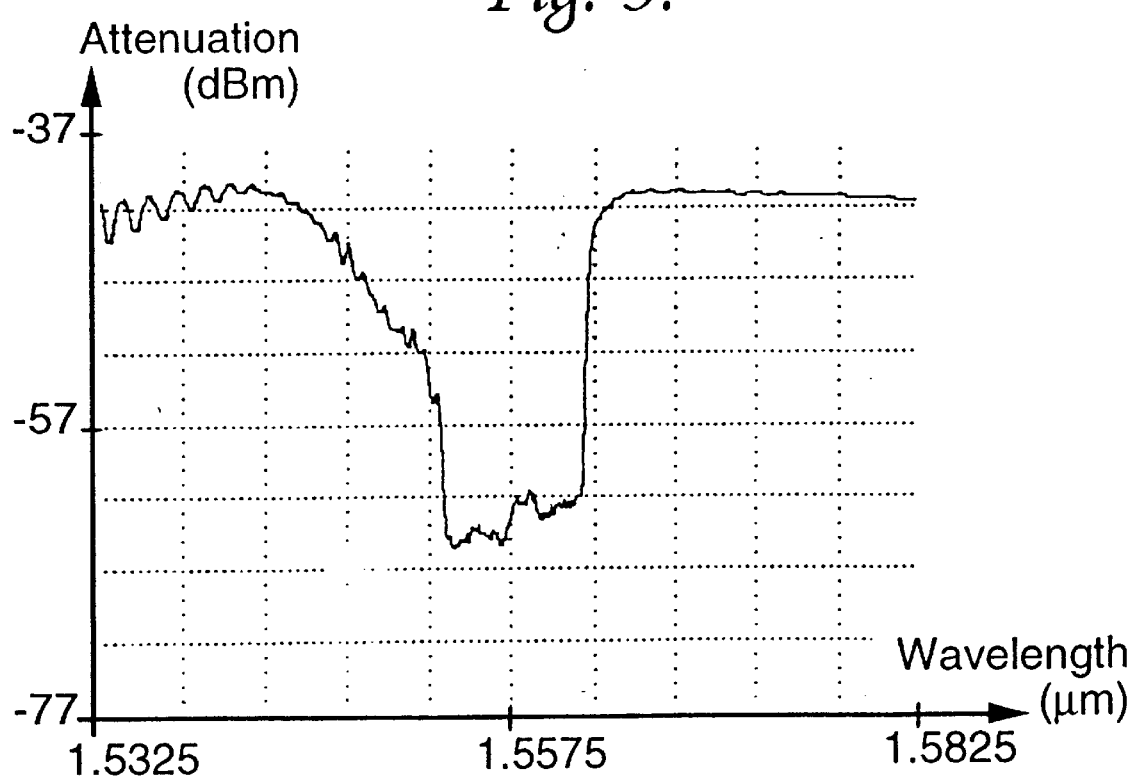

FIGS. 3 and 4 depict the spectral characteristics respectively in reflection and transmission of a Bragg reflection created grating in a boron/germania doped single mode optical fiber having a core-cladding index difference of $7 \times 10^{-3}$ and a core diameter of 7 $\mu$m. Photosensitivity of this fiber was further enhanced prior to the writing of the grating by a short period of high pressure hydrogen loading. The Bragg reflector was written using a light source comprising a coherent frequency doubled argon ion laser emitting at 244 nm and providing approximately 50 mW of cw power in a spot which, at the phase grating, measured approximately 2 mm long (in the axial direction of the fiber) by 125 $\mu$m wide (to match the fiber diameter). The spot was traversed the full length of the grating in a series of 2 mm steps, and between each step the tension in the fiber was adjusted to a new value by operation of the motorized translation stage 24. The spectral width of the grating response that car be written by this method is limited by the length of the phase mask 10 and the maximum strain to which the fiber 11 can be subjected. To allow effective clamping of the fiber 11 in the two towers 12 and 13 so that no slippage would occur at large strains, and to minimize the risk of fiber breakage, the plastics protective coating on the glass optical fiber was stripped from the fiber only in the region in which the grating was to be written. If was found that at subjecting the fiber to large strains by the clamping of the towers 12 and 13 to plastics coated regions of the fiber did produce some slippage between the figure and its coating at the clamping points. For this reason it was preferred not to increase the strain during the writing of the grating, but instead to pretension the fiber, and then reduce the strain during the writing process. The amount of each step in the reduction of the strain was designed to ensure that the response of each section of the overall grating produced at a specific strain of the fiber spectrally overlapped the responses of its adjacent sections so as to leave no gaps in the reflected spectrum. Due allowance was made in the determination of the magnitude of these strain reduction steps in respect of the strain optic effect.

In the case of the writing of the particular Bragg reflecting grating whose spectral characteristics are depicted in FIGS. 3 and 4, the fiber was pretensioned to provide an initial strain of 0.6% which was progressively released during the writing of the grating in 15 steps of 0.04%. The translation of the light beam between steps was 2 mm, and so the total lengths of the written Bragg reflecting grating was 3 mm. 30 seconds exposure time was used to write each section.

In the making of this grating translation stages were employed with a resolution of 0.4 $\mu$m, but no measures were taken to ensure precise phase continuity between adjacent sections of the grating, which accounts for the fine structure observed in the reflection characteristic depicted in FIG. 3. By using commercially available high resolution stepper drives, it should be possible to produce phase continuity at the grating interfaces, and thereby produce a cleaner reflection band.

The above description has exemplified a relatively simple method for producing gratings with controllable chirp from a uniform pitch phase mask. The maximum width is limited by the amount of strain to which it is possible to subject the fiber, this could however be overcome by using a selection of phase masks with different center wavelengths. The degree and rate of chirp can be easily tailored by selecting the length of each grating section and the rate of change of strain in the fiber. Additionally the profile of the grating can be controlled by using different exposure times for the writing of different sections of the grating. The method of the invention lends versatility to phase mask grating writing in a single grating, by providing a range of Bragg wavelengths other than that determined by the phase mask with the fiber at zero tension.

For providing a fringe pattern of acceptable contrast for the writing of the Bragg reflector in fiber 11 the depth of profile of the phase grating is preferably chosen to provide a phase step of $\pi$. The fringe pattern is generated in close proximity to the phase grating itself. As described in the specification of GB Patent Application No 9410545.9, the effect of second and higher diffracted orders is liable to impart to the fundamental period of the fringe pattern a fine structure which varies with the spacing between the fiber and the grating, and for this reason it may be preferred to modulate, as described therein, the separation between the grating and the fiber during the writing of each of the Bragg reflection grating sections.

I claim:

1. A method of writing a chirped Bragg reflection grating in a photosensitive optical fiber, which grating is created by traversing a beam of electro-magnetic radiation along the fiber axis, which beam is incident upon the fiber through a diffraction grating located adjacent the fiber and oriented to have diffracting elements extending at an angle to the fiber axis, wherein the fiber is longitudinally tensioned by an amount that is varied during the writing therein of the grating.

2. A method as claimed in claim 1, wherein the diffraction grating is a uniform pitch diffraction grating.

3. A method as claimed in claim 1, wherein the diffraction grating is a phase grating.

4. A method as claimed in claim 3, wherein the phase grating has a phase step of magnitude substantially equal to $\pi$.

5. A method as claimed in claim 1, wherein the distance between the diffraction grating and the fiber is modulated during the writing of the Bragg reflection grating.

6. A method as claimed in claim 1, wherein the exposure of the fibre to the electro-magnetic radiation is a non-uniform function of position along the length of the Bragg reflection grating.

* * * * *